(12) United States Patent
Tamura

(10) Patent No.: US 8,964,864 B2
(45) Date of Patent: Feb. 24, 2015

(54) TRANSMISSION SYSTEM

(75) Inventor: Hirotaka Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 13/546,094

(22) Filed: Jul. 11, 2012

(65) Prior Publication Data

US 2013/0044830 A1 Feb. 21, 2013

(30) Foreign Application Priority Data

Aug. 17, 2011 (JP) ................................. 2011-178556

(51) Int. Cl.
*H04L 27/00* (2006.01)
*H04L 12/835* (2013.01)

(52) U.S. Cl.
CPC ...................... *H04L 47/30* (2013.01)
USPC .......................................................... 375/259

(58) Field of Classification Search
CPC ............................ H04B 7/0641; H04B 7/0643
USPC ............................................. 375/259; 99/259
See application file for complete search history.

(56) References Cited

U.S. PATENT DOCUMENTS 5,748,806 A * 5/1998 Gates ............................. 710/315
5,838,950 A * 11/1998 Young et al. ..................... 703/21
7,673,091 B2 * 3/2010 Tiwari et al. ................... 710/308
2004/0230717 A1 * 11/2004 Funatsu et al. .................. 710/22
2005/0010703 A1 * 1/2005 Cheung et al. .................. 710/52
2005/0055592 A1 * 3/2005 Velasco et al. ................ 713/322
2006/0215678 A1 * 9/2006 Aoki ............................. 370/412
2008/0270668 A1 * 10/2008 Tiwari et al. ................... 710/308
2008/0313363 A1 * 12/2008 Granit et al. ..................... 710/24
2009/0024776 A1 * 1/2009 Cheung et al. ................ 710/110
2009/0268747 A1 10/2009 Kurata et al.

FOREIGN PATENT DOCUMENTS

JP 8-172426 7/1996
WO WO-2007/043373 A1 4/2007

* cited by examiner

*Primary Examiner* — Santiago Garcia
(74) *Attorney, Agent, or Firm* — Fujitsu Patent Center

(57) ABSTRACT

A transmission system has a receiver receiving data and a request signal from a transmitter, and a monitor circuit transmitting a valid acknowledge signal to the transmitter when a received data accumulation amount in the FIFO memory is smaller than a threshold, or transmitting an invalid acknowledge signal to the transmitter when the received data accumulation amount in the FIFO memory is larger than the threshold. The transmitter transmits the request signal which is valid and the data when the acknowledge signal is valid, or stops transmission processing of the data and transmits the request signal which is invalid when the acknowledge signal is invalid, and the receiver performs reception processing of the data when the request signal is valid or stops reception processing of the data when the request signal is invalid.

8 Claims, 16 Drawing Sheets

F I G. 5
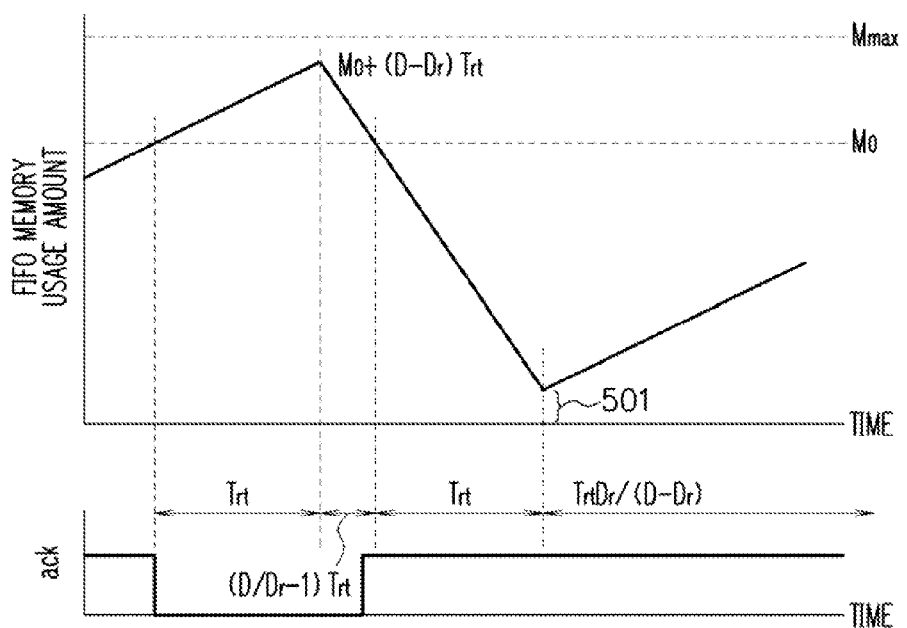

F I G. 7
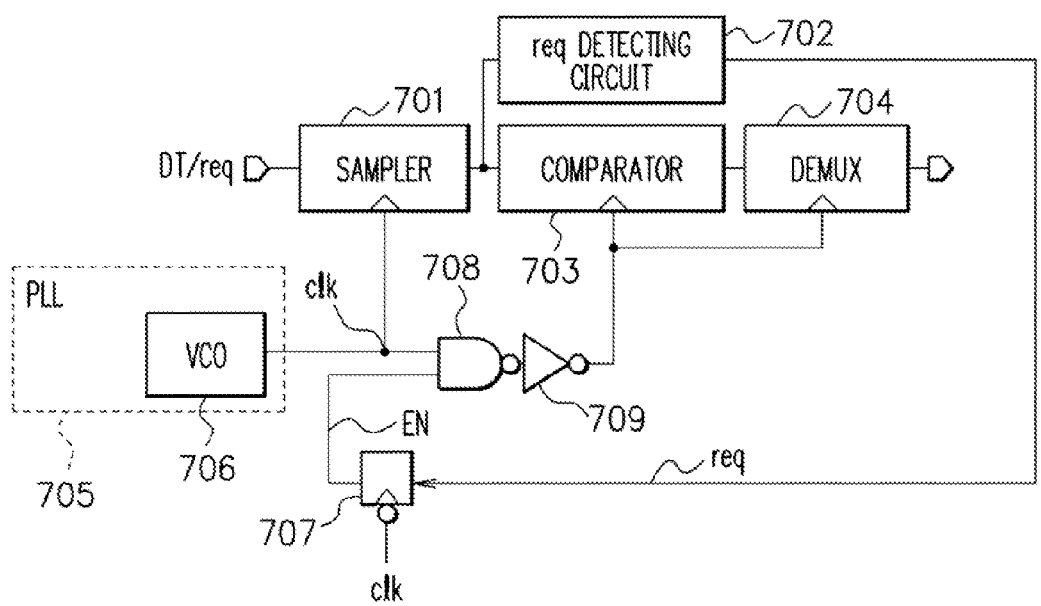

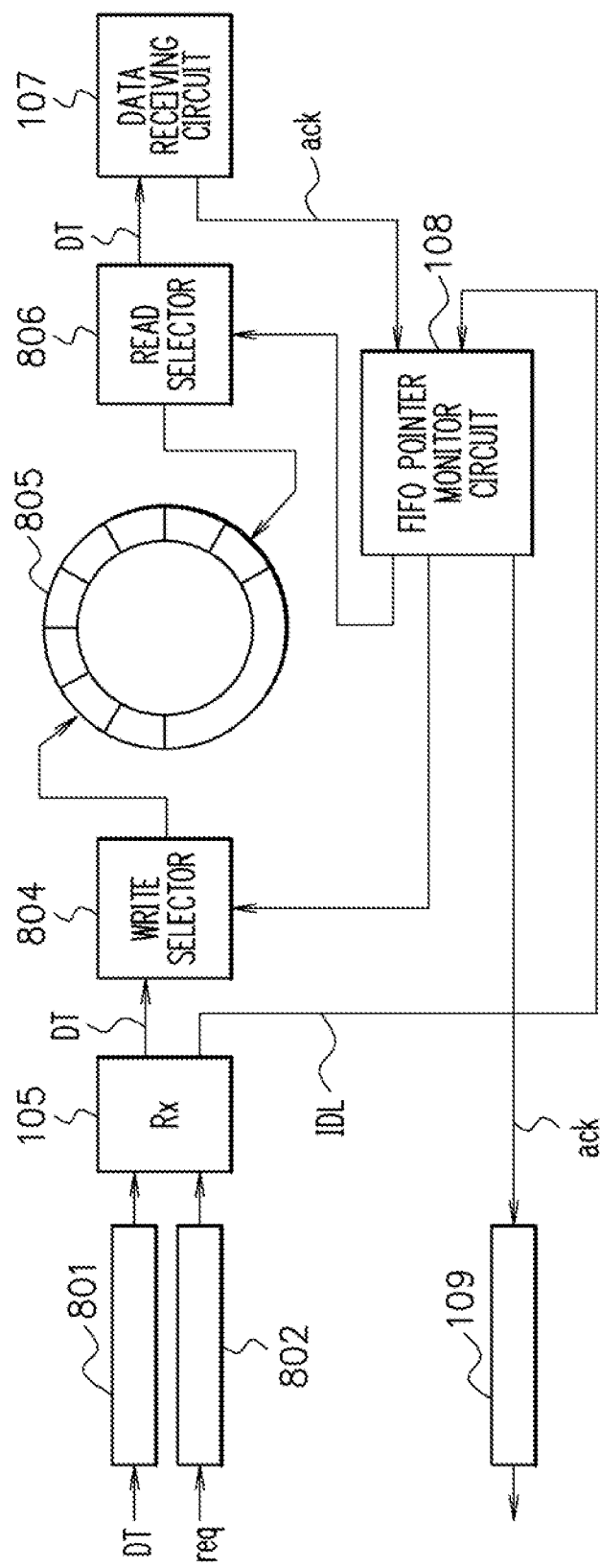

F I G. 15
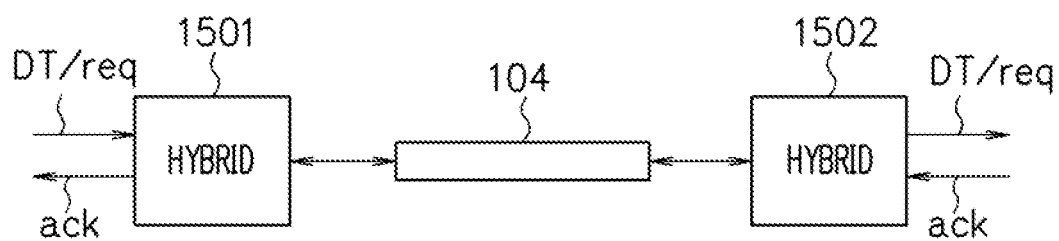

F I G. 17A
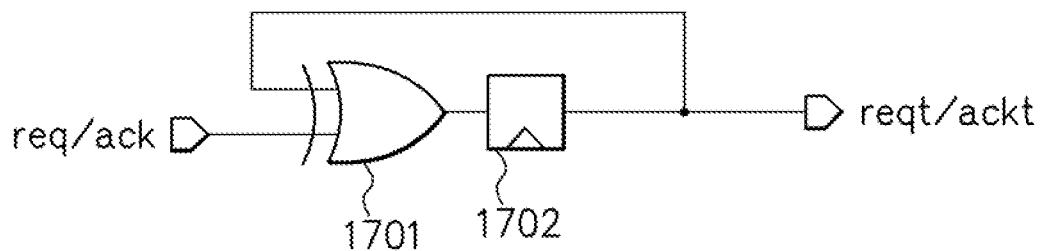
F I G. 17B
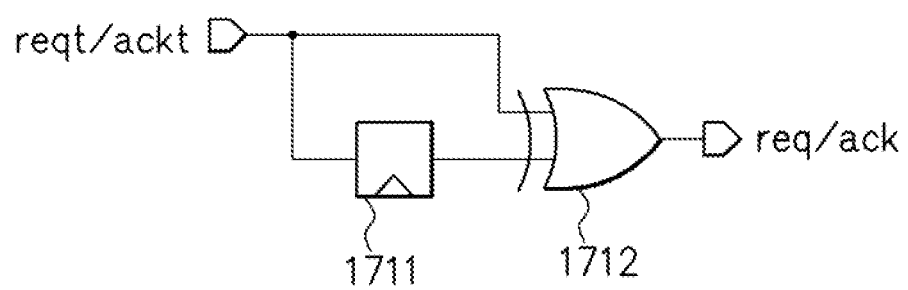
F I G. 17C
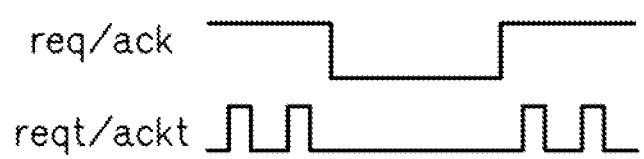

TRANSMISSION SYSTEM

CROSS-REFERENCE TO RELATED APPLICATION

This application is based upon and claims the benefit of priority of the prior Japanese Patent Application No. 2011-178556, filed on Aug. 17, 2011, the entire contents of which are incorporated herein by reference.

FIELD

The embodiments discussed herein are directed to a transmission system.

BACKGROUND

Accompanying improvement in performance of information processing equipment such as apparatuses and servers for communication backbone, it is necessary to improve information processing speed in devices or semiconductor chips. Further, to avoid a problem of heating, it is necessary to lower power consumption per performance at the same time as speed improvement. In a synchronous circuit, a considerable portion (several tens of percent) of power consumption is spent for clock signals. Reducing delays of logic circuits sufficiently for satisfying timing conditions also leads to increase in power consumption. As a method for solving these problems, there is an asynchronous logic method which performs a logical operation only when preparation of necessary data is completed. In an asynchronous logic circuit, a logical operation is performed after waiting until all inputs become valid, and completion of the logical operation is notified to the input side by returning a completion signal. In the asynchronous circuit, it is unnecessary to distribute clock signals for synchronization to the entire semiconductor chip, and it is also unnecessary for all logical operations to complete within a clock cycle. Thus, the asynchronous circuit can achieve low power consumption compared to the synchronous circuit.

Further, there is known an asynchronous data transmission system such that, in a transmission system performing asynchronous/synchronous speed conversion upon reception of asynchronous data from a terminal apparatus and performing synchronous data communication on a transmission path, there is provided means for writing asynchronous data of a transmission terminal apparatus to an FIFO memory at an asynchronous data transmission speed on the transmitting side, and a transmission operation to a transmission terminal apparatus is suspended when the FIFO memory overflows during writing by the writing means, thereby turning to an idle state (see, for example, Patent Literature 1).

Further, there is known a communication apparatus receiving data transmitted from another communication apparatus, the communication apparatus including receiving means for receiving data, first packet generating means for generating an acknowledge packet indicating contents of response to the other communication apparatus with respect to data received by the receiving means and transmitting the acknowledge packet to the other communication apparatus, and second packet generating means for generating a data request packet requesting transmission of data to the other communication apparatus regardless of the result of reception of data by the receiving means and transmitting the data request packet to the other communication apparatus (see, for example, Patent Literature 2).

[Patent Literature 1] Japanese Laid-open Patent Publication No. 8-172426

[Patent Literature 2] International Publication Pamphlet No. WO2007/043373

In modern information processing apparatuses, achievement of both reduction in power consumption and improvement in processing performance is a large problem. One effective method to reduce power consumption is to perform asynchronous operation such that circuits are operated only when necessary. Various methods are known for performing asynchronous operation inside a semiconductor chip. In a typical asynchronous logic circuit, a request signal is asserted when the circuit turns to a state capable of processing input data, and a completion signal is asserted when a signal is processed and the circuit becomes capable of accepting the next signal input. By such an asynchronous method, it becomes possible to reduce power consumption because the logic circuit operates only when processing is needed.

When the scale of the asynchronous logic circuit becomes large, it is necessary to make a logic circuit across plural semiconductor chips. In this case, if a typical asynchronous method similar to that in a semiconductor chip is used for exchanging signals between the semiconductor chips, there occurs a problem that the data rate of communication between the semiconductor chips decreases significantly. This is because when a valid signal is passed from a transmitting side to a receiving side, and the receiving side processes the signal and returns a completion signal, the time of the sum of a delay in a transmission path and a delay in a transceiver in amount of a round trip is needed at the minimum. This decreases the data rate to a fraction of that of a typical fast I/O. This problem exists not only in communication between semiconductor chips but also when signal transmission via a long distance with a large signal delay is performed inside a semiconductor chip.

Further, accompanying improvement in processing performance of semiconductor chips, what is called a fast I/O using serial transmission is used for signal communication between semiconductor chips. However, there exists a problem that there is no power consumption effect by the asynchronous operation because an internal circuit operates at high speed in a typical fast I/O even when it does not perform transmission/reception.

SUMMARY

A transmission system has: a first transmission path; a transmitter transmitting data and a request signal to the first transmission path; a receiver receiving the data and the request signal from the transmitter via the first transmission path; an FIFO memory to which the data received by the receiver are written; a data receiving circuit reading data in the FIFO memory and performing reception processing; and a monitor circuit transmitting a valid acknowledge signal to the transmitter when a data accumulation amount in the FIFO memory is smaller than a threshold, or transmitting an invalid acknowledge signal to the transmitter when the data accumulation amount in the FIFO memory is larger than the threshold, in which the transmitter transmits the request signal which is valid and the data when the acknowledge signal is valid, or stops transmission processing of the data and transmits the request signal which is invalid when the acknowledge signal is invalid, and the receiver performs reception processing of the data when the request signal is valid or stops reception processing of the data when the request signal is invalid.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a usage amount of the FIFO memory;

FIG. 7 is a diagram illustrating a structure example of a receiver;

FIG. 8 is a diagram illustrating a structure example of a receiving device of a second embodiment;

FIG. 15 is a diagram illustrating a structure example of part of a transmission system according to a seventh embodiment;

FIG. 17A to FIG. 17C are diagrams illustrating a modulation circuit and a demodulation circuit according to a ninth embodiment.

DESCRIPTION OF EMBODIMENTS

—First Embodiment—

Figure 1:
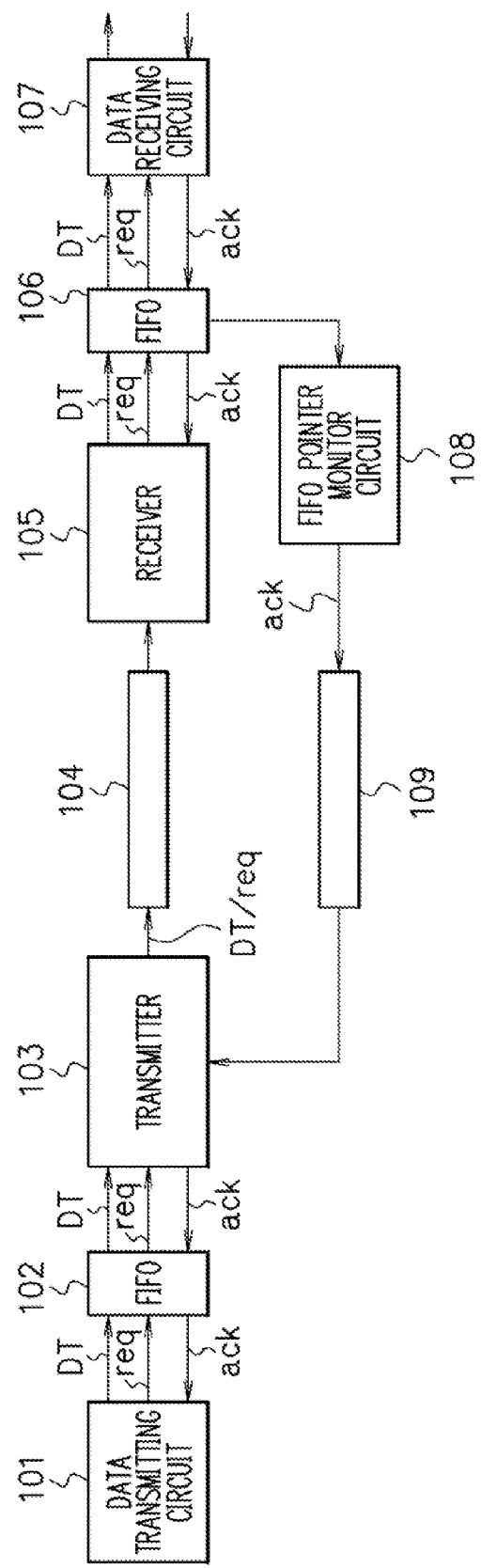
FIG. 1 is a diagram illustrating a structure example of a transmission system according to a first embodiment.

FIG. 1 is a diagram illustrating a structure example of a transmission system according to a first embodiment. The transmission system is capable of transmitting and receiving a signal at high bit rate inside a semiconductor chip and between semiconductor chips of an integrated circuit or inside a device and between devices. A transmitting device has a data transmitting circuit 101, an FIFO (First In First Out) memory 102, and a transmitter 103. A receiving device has a receiver 105, an FIFO memory 106, a data receiving circuit 107, and an FIFO pointer monitor circuit 108. The transmission system performs data transmission with an asynchronous interface using a request (demand) signal req and an acknowledge (confirmation) signal ack.

The data transmitting circuit 101 outputs a valid (asserted) request signal req to the FIFO memory 102. Upon input of the valid request signal req, the FIFO memory 102 outputs a valid acknowledge signal ack to the data transmitting circuit 101. Upon input of the valid acknowledge signal ack, the data transmitting circuit 101 outputs data DT to the FIFO memory 102. The data DT are written in the FIFO memory 102.

The FIFO memory 102 outputs a valid request signal req to the transmitter 103. Upon input of the valid request signal req, the transmitter 103 outputs a valid acknowledge signal ack to the FIFO memory 102. Upon input of the valid acknowledge signal ack, the FIFO memory 102 reads and outputs data to the transmitter 103. Upon input of the valid request signal req from the FIFO memory 102 and a valid acknowledge signal ack from a second transmission path 109, the transmitter 103 transmits a valid request signal req and data DT to the receiver 105 via a first transmission path 104.

The receiver 105 receives the request signal req and the data DT from the transmitter 103 via the first transmission path 104. Further, the receiver 105 performs reception processing of the data DT when the received request signal req is valid, and outputs a valid request signal req to the FIFO memory 106. Upon input of the valid request signal req, the FIFO memory 106 outputs a valid acknowledge signal ack to the receiver 105. Upon input of the valid acknowledge signal ack, the receiver 105 outputs the data DT to the FIFO memory 106. The data DT are written in the FIFO memory 106.

The FIFO memory 106 outputs a valid request signal req to the data receiving circuit 107. Upon input of the valid request signal req, the data receiving circuit 107 outputs a valid acknowledge signal ack to the FIFO memory 106. Upon input of the valid acknowledge signal ack, the FIFO memory 106 outputs data DT to the data receiving circuit 107. The data receiving circuit 107 reads data in the FIFO memory 106 and performs reception processing.

The FIFO pointer monitor circuit 108 transmits a valid acknowledge signal ack to the transmitter 103 via the second transmission path 109 when a data accumulation amount in the FIFO memory 106 is smaller than a threshold, or transmits an invalid acknowledge signal ack to the transmitter 103 via the second transmission path 109 when the data accumulation amount in the FIFO memory 106 is larger than the threshold.

The transmitter 103 transmits a valid request signal req and data DT to the receiver 105 via the first transmission path 104 when the acknowledge signal ack received from the FIFO pointer monitor circuit 108 is valid, or stops transmission processing of data DT and transmits an invalid request signal req to the receiver 105 via the first transmission path 104 when the acknowledge signal ack received from the FIFO pointer monitor circuit 108 is invalid. Specifically, the transmitter 103 stops operation of a data transmission processing unit by stopping a clock signal when the received acknowledge signal ack is invalid. Thus, the power consumption of the transmitter 103 can be reduced.

The receiver 105 performs reception processing of data DT when the request signal req received from the transmitter 103 is valid, or stops reception processing of data DT when the request signal req received from the transmitter 103 is invalid. Specifically, the receiver 105 stops operation of a data reception processing unit by stopping a clock signal when the received request signal req is invalid. Thus, the power consumption of the receiver 105 can be reduced.

The first transmission path 104 may transmit the data DT and the request signal req either in parallel or in series.

One bit time (unit interval: UI) of a transmission rate of data DT is sufficiently smaller than a delay time of the first transmission path 104, and a fast I/O circuit capable of reducing power consumption can be achieved by asynchronous operation. The transmitter 103 transmits data DT continuously as long as the inputted request signal req and acknowledge signal ack are valid. The FIFO pointer monitor circuit 108 monitors the data accumulation amount in the FIFO memory 106. For example, when the FIFO memory 102 is a ring buffer, a write pointer of the FIFO memory 102 increases as data DT are written in the FIFO memory 102 from the data transmitting circuit 101, and a read pointer of the FIFO memory 102 increases as the data DT of the FIFO memory 102 are outputted to the transmitter 103. The difference between the write pointer and the read pointer is the accumulated data amount. Similarly, a write pointer of the FIFO memory 106 increases as data DT are written in the FIFO memory 106 from the receiver 105, and a read pointer of the FIFO memory 106 increases as the data DT is read from the FIFO memory 106 to the data receiving circuit 107. The difference between the write pointer and the read pointer is the accumulated data amount.

Figure 2:
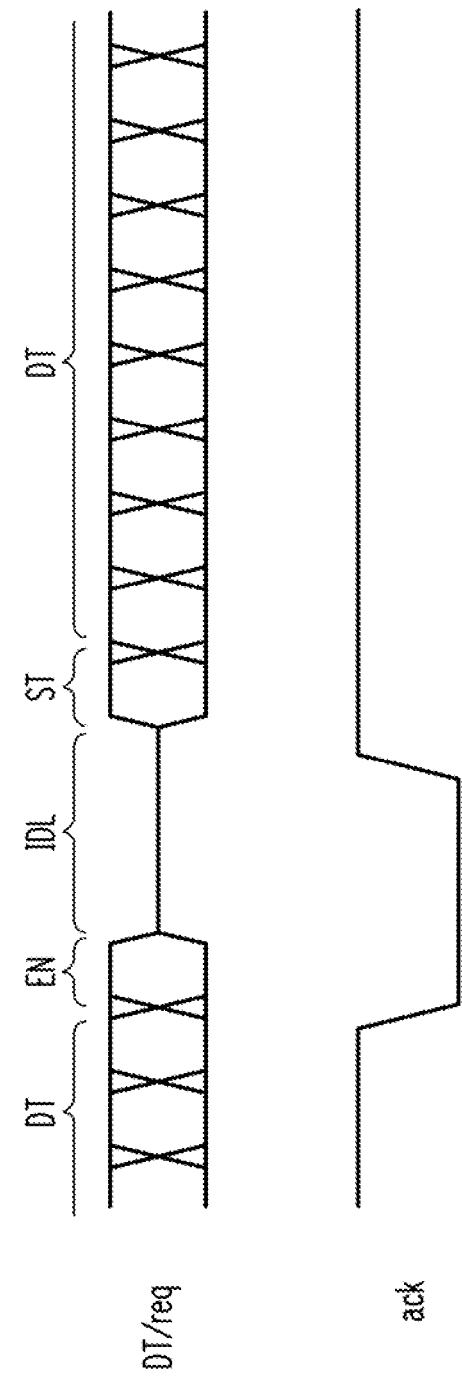
FIG. 2 is a diagram illustrating an example of transmitting data and a request signal serially via a first transmission path.
Figure 3:
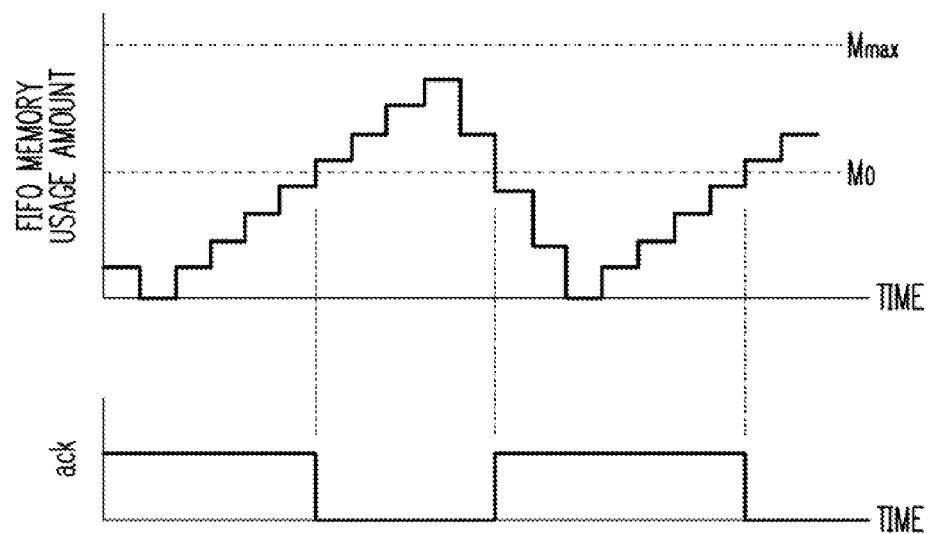
FIG. 3 is a diagram illustrating a usage amount of a FIFO memory.

FIG. 2 is a diagram illustrating an example of transmitting data DT and a request signal req serially via the first transmission path 104, and FIG. 3 is a diagram illustrating a usage amount of the FIFO memory 106. The upper limit value of the usage amount of the FIFO memory 106 is Mmax. The acknowledge signal ack is the signal transmitted by the FIFO pointer monitor circuit 108 to the transmitter 103 via the transmission path 109, with a high level indicating validity (asserted) and a low level indicating invalidity (deasserted). When the acknowledge signal ack is valid, the transmitter 103 transmits the data DT to the receiver 105 via the first transmission path 104. In the beginning, the accumulated data amount in the FIFO memory 106 is smaller than a threshold Mo. When the processing speed of the data receiving circuit 107 is low, the accumulated data amount in the FIFO memory 106 soon becomes larger than the threshold Mo. Then, the FIFO pointer monitor circuit 108 invalidates the acknowledge signal ack. The transmitter 103 then stops transmission of the data DT and notifies invalidation of the request signal req by transmitting a data end signal EN. Thereafter, the transmitter 103 turns to an idle state IDL by outputting an intermediate potential, thereby turning to a low power consumption state. Thereafter, the accumulated data amount in the FIFO memory 106 soon becomes smaller than the threshold Mo. Then, the FIFO pointer monitor circuit 108 validates the acknowledge signal ack. The transmitter 103 then notifies validation of the request signal req by transmitting a data start signal ST. Thereafter, the transmitter 103 transmits the data DT to the receiver 105 via the first transmission path 104. The data end signal EN and the data start signal ST are of a specific bit pattern (for example, a comma of 10B/8B (K28.5)).

The threshold Mo is decided so that the frequency of transition between valid and invalid of the acknowledge signal ack does not become too often. The FIFO memory usage amount upper limit value Mmax is set to a value with which the FIFO memory 106 does not overflow during a delay time until the transmitter 103 recognizes the acknowledge signal ack and stops transmission of the data DT.

When the data rate D [bit/sec] is larger than an average processing speed Dr [bit/sec] of the data receiving circuit 107, data are accumulated in the FIFO memory 106. However, assuming that the receiver 105 is adequately performing the processing as long as the accumulated data amount in the FIFO memory 106 does not exceed the threshold Mo, the FIFO pointer monitor circuit 108 keeps the acknowledge signal ack valid. When the data accumulation amount exceeds the threshold Mo, the FIFO pointer monitor circuit 108 determines that the processing of the receiver 105 is not performed adequately, and invalidates the acknowledge signal ack. The transmitter 103 keeps transmitting the data DT continuously as long as the acknowledge signal ack from the FIFO pointer monitor circuit 108 and the request signal req from the FIFO memory 102 are both valid. The request signal req from the FIFO memory 102 is valid as long as the data are accumulated in the FIFO memory 102.

To reduce the power of I/O, the transmitter 103 and the receiver 105 stop operation immediately when the acknowledge signal ack is invalid, thereby entering a low power consumption mode. In the low power consumption mode, a driver stage of the transmitter 103 is in a low power consumption mode. To notify the receiver 105 of entering the low power consumption mode, the transmitter 103 creates and transmits codes (or signals) EN and ST which can be recognized by others to the first transmission path 104. The transmitter 103 activates a monitor circuit for the acknowledge signal ack, and the receiver 105 activates a monitor circuit for the request signal req. Signal detection by the monitor circuits causes quick returning from the low power consumption mode to the normal mode. It is also possible to perform phase synchronization of internal clock signals by appropriately transmitting or receiving a control signal dedicated for synchronization during the idle state IDL in which data transmission is stopped.

According to this embodiment, one cycle time of transmission is not needed to be equal to or more than the total delay time of the delay time of the first transmission path 104 and the delay time of the transmitting and receiving devices in amount of a round trip. Accordingly, the data rate is not limited by the delay time of the first transmission path 104 and the delay time of the transmitting and receiving devices in amount of a round trip. When the data rate of the first transmission path 104 is sufficiently large, the transmission speed corresponding to the processing performance of the data receiving circuit 107 can be obtained naturally. During a period in which the I/O is not operating, the transmitter 103 and the receiver 105 are in a low power consumption mode, and thus the power consumption can be reduced.

Here, the relationship of the threshold Mo of the FIFO memory 106, the usage amount upper limit value Mmax of the FIFO memory 106, and a delay time Trt in amount of a round trip of the transmitting and receiving devices with operating rates of the transmitter 103 and the receiver 105 will be described. Here, the data rate of signal transmission is D [bit/sec], and the data processing speed of the data receiving circuit 107 is Dr [bit/sec].

Figure 4:
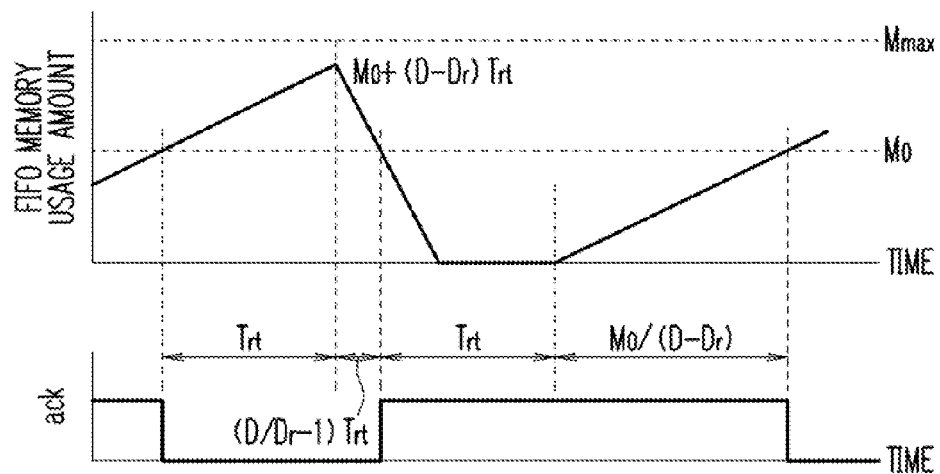
FIG. 4 is a diagram illustrating a usage amount of the FIFO memory.

The case where D>Dr similarly to FIG. 3 will be described below. When the staircase wave of a variation of the data accumulation amount in the FIFO memory 106 of FIG. 3 is approximated by a straight line, it becomes as illustrated in FIG. 4 or FIG. 5 depending on the size of the threshold Mo. FIG. 4 is of the case where Mo<Dr×Trt, and FIG. 5 is of the case where Mo>Dr×Trt. In the case of Mo>Dr×Trt of FIG. 5, an excess delay time due to a data accumulation amount 501 occurs in the FIFO memory 106, and thus it can be seen that it is not desirable to set the value of the threshold Mo larger than necessary.

Hereinafter, the case of FIG. 4 (Mo<Dr×Trt) will be described. When the data accumulation amount in the FIFO memory 106 exceeds the threshold Mo, the acknowledge signal ack becomes invalid. The time from the timing the acknowledge signal ack becomes invalid first in FIG. 4 to the timing the input of data DT from the transmitter 103 stops is Trt. As the data accumulation amount in the FIFO memory 106 decreases, the time until the data accumulation amount returns again to the threshold Mo is (D/Dr−1)×Trt. The time from the timing the acknowledge signal ack becomes valid to the timing the input of data DT from the transmitter 103 is resumed again is Trt. The time at which the data accumulation amount from the FIFO memory 106 becomes equal to the threshold Mo again is Mo/(D−Dr). Therefore, a cycle Ta of the acknowledge signal ack to be valid or invalid is represented by the following expression.

$$Ta=2\times Trt+(D/Dr-1)\times Trt+Mo/(D-Dr)$$

It can be seen from this expression that the usage amount upper limit value Mmax of the FIFO memory 106 may be set considering the following three factors (1) to (3).

(1) Preferably, the usage amount upper limit value Mmax of the FIFO memory 106 is not exceeded in operation.

When the usage amount upper limit value Mmax of the FIFO memory 106 is exceeded, the received data would be lost, and hence it is necessary to avoid this. To satisfy this condition, the following condition may be satisfied.

$$Mmax-Mo>(D-Dr)\times Trt$$

(2) Preferably, the delay time for data to pass through the FIFO memory 106 is minimized.

The maximum value of the delay time for data to pass through the FIFO memory 106 is represented by the following expression.

$$\{Mo+(D-Dr)\times Trt\}/Dr$$

To minimize this delay time, it is desirable to make the difference between the data rate D and the processing speed Dr as small as possible, and also the threshold Mo as small as possible. To minimize the delay time of the FIFO memory 106 under the condition that D, Dr, Trt are given, the value of the threshold Mo may be minimized, that is, zero, but making the threshold Mo needlessly small is not a good idea in the sense of power consumption reduction of the transmitter 103.

(3) Preferably, the cycle Ta is not too short for the purpose of power reduction of the transmitter 103.

If the cycle Ta of the acknowledge signal ack to be valid or invalid repetitively is too short, there is a problem that a wasted time for stopping and resuming the transmitter 103 and the receiver 105 and wasted power consumption in a control circuit for stopping and resuming them become large. When the frequency 1/Ta of occurrence of validity and invalidity of the acknowledge signal ack is smaller to some degree than the data rate D and the processing speed Dr (for example, not more than 5%), the effect of power reduction by stopping the transmitter 103 and the receiver 105 becomes larger than the power increase for control. The ratio of the transmitter 103 to operate is given by Trt+Mo/(D−Dr) in the cycle Ta, and thus the average power Pa of the transmitter 103 is represented by the following expression where Eo is energy consumption for stopping and resuming the transmitter 103 per cycle.

$$Pa=Eo/Ta+Pt\times\{Trt+Mo/(D-Dr)\}/Ta$$

Here, Pt is power consumption when the transmitter 103 operates continuously. It is necessary to choose the value of the threshold Mo so that the value of Pa becomes sufficiently small relative to an assumed range of Trt.

Note that when the transmitter 103 operates continuously by Dr>D, it does not become necessary to stop the transmitter 103. In general, the receiver 105 has a mechanism to compare phases of the internal clock signal of the receiver and input data, and thus it is possible to monitor the phase slip of the input data and the internal clock signal. In the case where Dr>D, the output of the receiver 105 may be invalidated by the amount of one cycle every time the phase slip occurs, and data would not be lost.

Figure 6A:
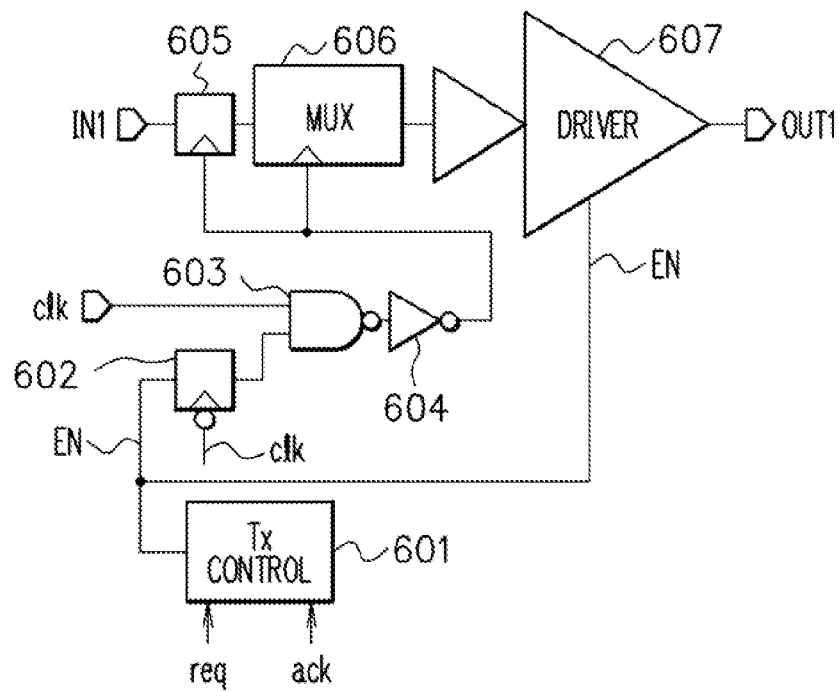
FIG. 6A is a diagram illustrating a structure example of a transmitter.

FIG. 6A is a diagram illustrating a structure example of the transmitter 103. Data DT are inputted to the transmitter 103 via an input terminal IN1, and the transmitter outputs the data DT and a request signal req via an output terminal OUT1. A transmitter control circuit 601 outputs as an enable signal EN a logical product (AND) signal of the request signal req from the FIFO memory 102 and the acknowledge signal ack from the FIFO pointer monitor circuit 108. The enable signal EN becomes high level only when both the request signal req and the acknowledge signal ack are both high level (valid). A flip flop 602 latches the enable signal EN in synchronization with a falling edge of a clock signal clk. A negative logical product (NAND) circuit 603 outputs a negative logical product signal of an output signal of the flip flop 602 and the clock signal clk. An inverter 604 outputs a logical inversion signal of the output signal of the negative logical product circuit 603. Therefore, the inverter 604 outputs the clock signal clk when the enable signal EN is high level, and is able to stop the clock signal clk by outputting a low level fixed signal when the enable signal EN is low level. A flip flop 605 latches the data DT at the input terminal IN1 in synchronization with the clock signal outputted by the inverter 604. A multiplexer 606 converts the data DT outputted by the flip flop 605 from parallel to serial in synchronization with the clock signal outputted by the inverter 604. When the clock signal outputted by the inverter 604 is stopped by the enable signal EN, the operation of the flip flop 605 and the multiplexer 606 stops, and the power consumption can be reduced. That is, the transmitter 103 stops operation of a data transmission processing unit (the flip flop 605 and the multiplexer 606) by stopping the clock signal when the acknowledge signal ack is invalid.

When the enable signal EN is high level, a driver 607 amplifies binary data DT outputted by the multiplexer 606 and outputs the data DT at high level or low level to the output terminal OUT1. Further, when the enable signal EN is low level, the driver 607 outputs a signal with an intermediate potential to the output terminal OUT1 as in the idle state IDL of FIG. 2, thereby entering the low power consumption mode.

Figure 6B:
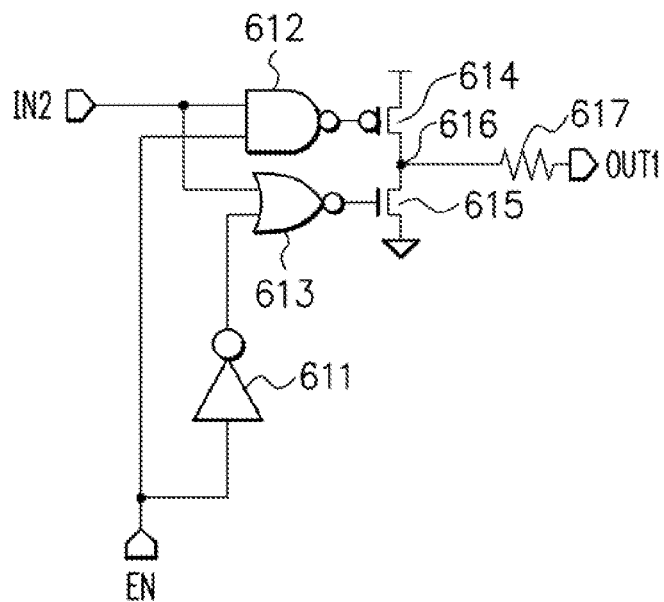
FIG. 6B is a diagram illustrating a structure example of a driver.

FIG. 6B is a diagram illustrating a structure example of the driver 607. An output signal of the multiplexer 606 is inputted to the driver 607 via an input terminal IN2, and the driver outputs a signal to the output terminal OUT1. A negative logical product circuit 612 outputs a negative logical product signal of the signal at the input terminal IN2 and the enable signal EN. An inverter 611 outputs a logical inversion signal of the enable signal EN. A negative logical sum (NOR) circuit 613 outputs a negative logical sum signal of the output signal of the inverter 611 and the signal at the input terminal IN2. A p-channel field effect transistor 614 has a source connected to a power supply voltage node, a gate connected to an output terminal of the negative logical product circuit 612, and a drain connected to an output node 616. An re-channel field effect transistor 615 has a drain connected to the output node 616, a gate connected to an output terminal of the negative logical sum circuit 613, and a source connected to a ground potential node. A resistor 617 is connected between the output node 616 and the output terminal OUT1.

When the enable signal EN is high level, if data at the input terminal IN2 are high level the transistor 614 turns on, the transistor 615 turns off, and the data at high level are outputted via the output terminal OUT1, or if data at the input terminal IN2 are low level the transistor 614 turns off, the transistor 615 turns on, and the data at low level are outputted via the output terminal OUT1. When the enable signal EN is low level, the transistors 614 and 615 turn off, and the output terminal OUT1 turns to an intermediate potential, thereby entering the low power consumption mode. The transmitter 103 is capable of stopping and resuming by the time of the same order as the bit time of the first transmission path 104.

FIG. 7 is a diagram illustrating a structure example of the receiver 105. A phase lock loop (PLL) circuit 705 has a voltage controlled oscillator (VCO) 706 and generates the clock signal clk. A sampler 701 samples and outputs, in synchronization with the clock signal clk, a serial signal of the data DT and the request signal req of FIG. 2 received from the first transmission path 104. A request detecting circuit 702 detects the request signal req based on the output signal of the sampler 701. For example, as illustrated in FIG. 2, the request detecting circuit 702 outputs a request signal req at low level (invalid) upon detection of the data end signal EN, or outputs a request signal req at high level (valid) upon detection of the data start signal ST. A flip flop 707 latches the request signal req in synchronization with a falling edge of the clock signal clk and outputs the enable signal EN. When the request signal req becomes high level, the enable signal EN also becomes high level, and when the request signal req becomes low level, the enable signal EN also becomes low level. A negative logical product circuit 708 outputs a negative logical product signal of the enable signal EN and the clock signal clk. An inverter 709 outputs a logical inversion signal of the output signal of the negative logical product circuit 708. Therefore, the inverter 709 outputs the clock signal clk when the enable signal EN is high level, and is able to stop the clock signal clk by outputting a low level fixed signal when the enable signal EN is low level. A comparator 703 converts output data of the sampler 701 from analog to digital in synchronization with the clock signal outputted by the inverter 709. A demultiplexer 704 converts output data of the comparator 703 from serial to parallel in synchronization with the clock signal outputted by the inverter 709. When the clock signal outputted by the inverter 709 is stopped by the enable signal EN, operation of the comparator 703 and the demultiplexer 704 stops, and the power consumption can be reduced. That is, the receiver 105 stops operation of a data reception processing unit (the comparator 703 and the demultiplexer 704) by stopping the clock signal when the request signal req is invalid. In the case of stopping, the sampler 701 and the request detecting circuit 702 are allowed to operate for detecting the request signal req, and the phase lock loop circuit 705 is also allowed to operate since it takes time to resume. Further, when the request signal req inputted from the FIFO memory 106 becomes invalid, output of data from the demultiplexer 704 to the FIFO memory 106 is stopped.

This embodiment has a characteristic that the data rate is not limited by the delay time of the first transmission path 104 and the delay time of a signal which makes a round trip between the transmitting and receiving devices. For example, the time for making a round trip on the first transmission path 104 of 20 cm is about 2 ns, and thus use of an ordinary asynchronous protocol does not allow performing transmission at 500 M bits/second or higher even when the delay time of the transmitter 103 and the receiver 105, the occurrence time of the acknowledge signal ack, and the delay time of a circuit performing processing are zero. On the other hand, in this embodiment, a data rate equivalent to that of a typical fast I/O (for example, 10 G bits/second) can be obtained, and thus a speed improvement of one order of magnitude or more can be obtained. Further, in this embodiment, no excess transmission delay exists. For example, the delay due to the FIFO memory 106 is always a minimum value corresponding to the processing performance of the data receiving circuit 107. Further, when data transmission is not performed, both the transmitter 103 and the receiver 105 stop, and thus there is an advantage that the power consumption of the fast I/O decreases in a manner scaled to the data rate.

—Second Embodiment—

FIG. 8 is a diagram illustrating a structure example of a receiving device according to a second embodiment. Differences of this embodiment from the first embodiment will be described below. A receiver 105 receives data DT and a request signal req in parallel from a transmitter 103. Specifically, the receiver 105 receives from the transmitter 103 the data DT via a transmission path 801 and the request signal req via a transmission path 802. The receiver 105 outputs the data DT to a write selector 804 when the request signal req is valid, or outputs an idle signal IDL to a FIFO pointer monitor circuit 108 when the request signal req is invalid. Further, upon reception of an invalid request signal req, the receiver 105 stops part of operation and performs only monitoring of the request signal req. Further, upon reception of a clock synchronization signal, the receiver 105 adjusts the phase of the clock signal.

An FIFO memory 106 has a write selector 804, a ring buffer 805, and a read selector 806. The write selector 804 writes data DT to a write pointer in the ring buffer 805. The read selector 806 reads data DT from a read pointer of the ring buffer 805 and outputs the data to a data receiving circuit 107. The FIFO pointer monitor circuit 108 calculates a data accumulation amount in the ring buffer 805 based on the write pointer of the write selector 804 and the read pointer of the read selector 806, and transmits an acknowledge signal ack to the transmitter 103 via a transmission path 109 according to the data accumulation amount.

The FIFO pointer monitor circuit 108 controls the write pointer of the write selector 804 and the read pointer of the read selector 806. Further, the FIFO pointer monitor circuit 108 monitors the data accumulation amount in the ring buffer 805, and determines that the processing speed of the receiver 105 is sufficient when the data accumulation amount is equal to or lower than a threshold Mo and validates the acknowledge signal ack. When the data accumulation amount in the ring buffer 805 exceeds the threshold Mo, the FIFO pointer monitor circuit 108 invalidates the acknowledge signal ack. The FIFO pointer monitor circuit 108 also monitors whether the processing speed of the data receiving circuit 107 is sufficient by using an acknowledge signal ack issued by the data receiving circuit 107, and invalidates the acknowledge signal ack to be transmitted to the transmitter 103 when this acknowledge signal ack becomes invalid.

Figure 9B:
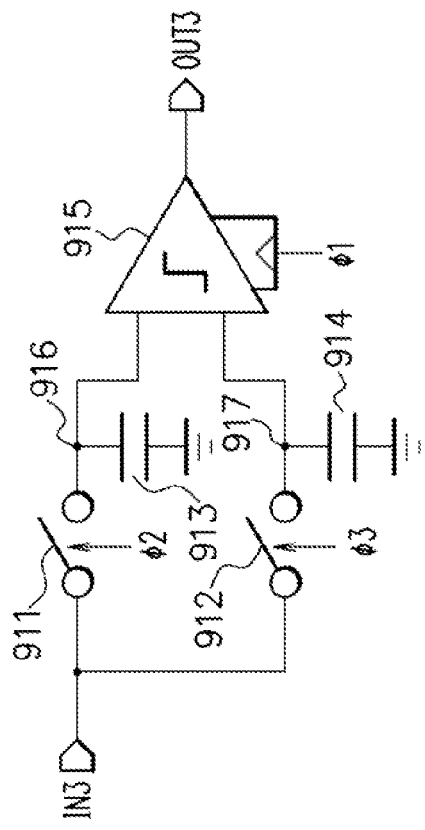
FIG. 9B is a diagram illustrating a structure example of a request detecting circuit in the receiver of FIG. 7.
Figure 9C:
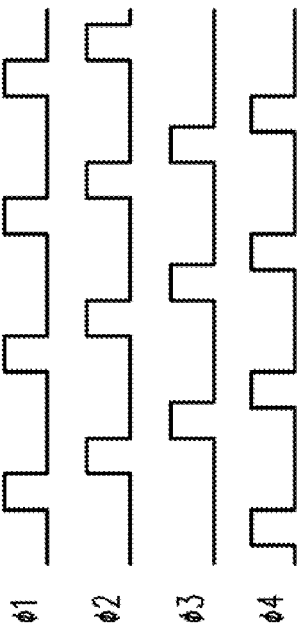
FIG. 9C is a diagram illustrating four-phase clock signals.
Figure 9A:
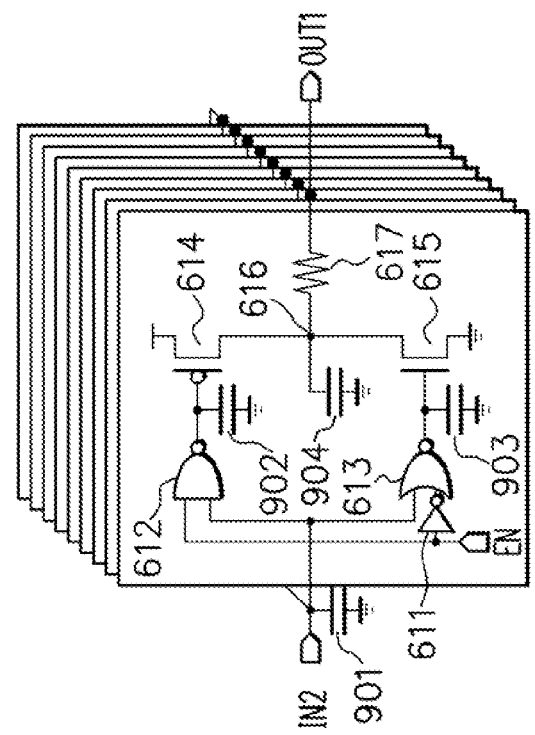
FIG. 9A is a diagram illustrating a structure example of the driver of FIG. 6A.

FIG. 9A is a diagram illustrating a structure example of the driver 607 of FIG. 6A and has the same basic structure as FIG. 6B. Differences of the circuit of FIG. 9A from the circuit of FIG. 6B will be described below. A capacitor 901 is of 60 fF for example and is connected between the input terminal IN2 and a ground potential node. A capacitor 902 is of 8 fF for example and is connected between an output terminal of a negative logical product circuit 612 and the ground potential node. A capacitor 903 is of 8 fF for example and is connected between an output terminal of a negative logical sum circuit 613 and the ground potential node. A capacitor 904 is of 7 fF for example and is connected between an output node 616 and the ground potential node. A resistor 617 is of 329 Ω for example. When the enable signal EN becomes low level (invalid), a pull-up transistor 614 and a pull-down transistor 615 both turn off, and thus an output terminal OUT1 becomes high impedance and its power consumption becomes almost zero.

FIG. 9B is a diagram illustrating a structure example of the request detecting circuit 702 in the receiver 105 of FIG. 7, and FIG. 9C is a diagram illustrating four-phase clock signals φ1 to φ4. In a state that the receiver 105 is stopped, only the request detecting circuit 702 is allowed to operate, and the comparator 703 and the demultiplexer 704 are stopped to reduce power consumption. A switch 911 connects an input terminal IN3 and a node 916 when the clock signal φ2 becomes high level, and disconnects the input terminal IN3 and the node 916 when the clock signal φ2 becomes low level. A switch 912 connects the input terminal IN3 and a node 917 when the clock signal φ3 becomes high level, and disconnects the input terminal IN3 and the node 917 when the clock signal φ3 becomes low level. A capacitor 913 is connected between the node 916 and a ground potential node. A capacitor 914 is connected between the node 917 and the ground potential node. A comparator 915 determines that there is transition of data when the difference in voltage between the nodes 916 and 917 exceeds a threshold in synchronization with the clock signal φ1, and outputs a valid request signal req to an output terminal OUT3. The request detecting circuit 702 samples data at intervals of 0.5 UI and determines that there is data transition when the difference in value between continuous samples exceeds a threshold. When there is data transition, the comparator 915 recognizes a valid request signal req from the transmitter 103 and outputs the valid request signal req.

—Third Embodiment—

Figure 10:
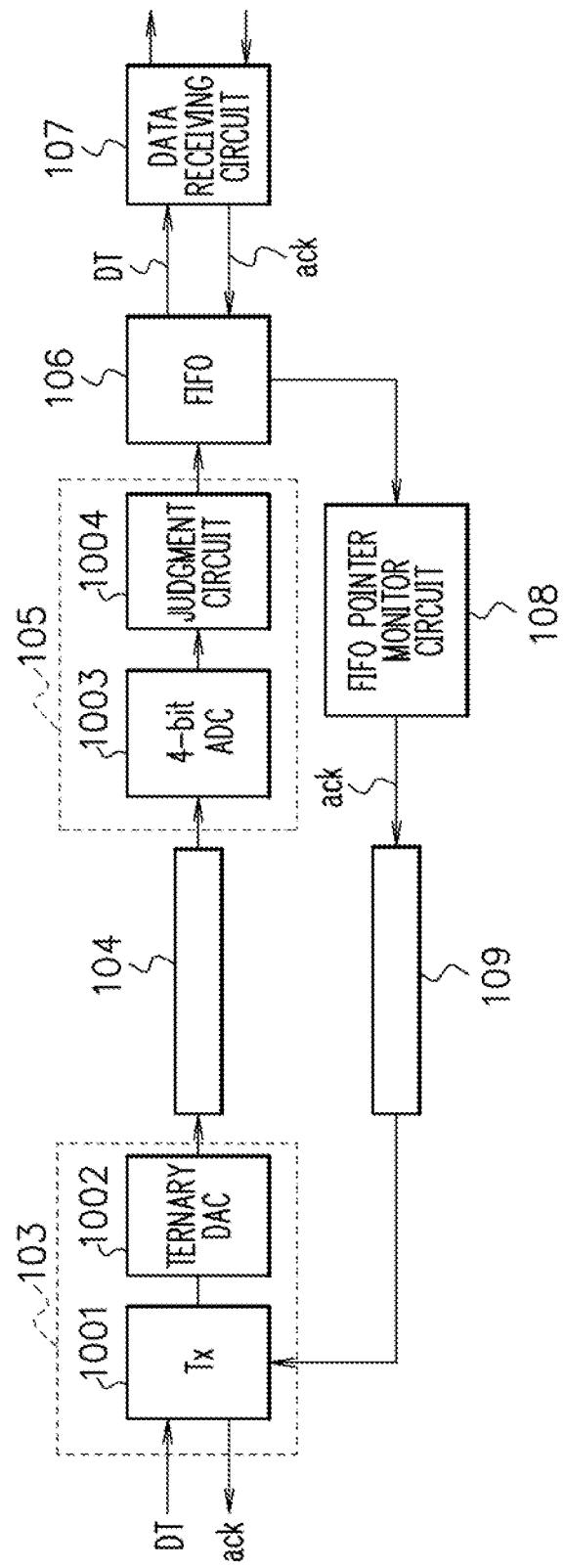
FIG. 10 is a diagram illustrating a structure example of a transmission system according to a third embodiment.

FIG. 10 is a diagram illustrating a structure example of a transmission system according to a third embodiment. Differences of this embodiment from the first embodiment will be described below. A transmitter 103 has a transmitter 1001 and a ternary digital-analog converter 1002. The transmitter 1001 outputs a ternary digital signal for transmitting a request signal req together with data DT. The ternary digital-analog converter 1002 converts the ternary digital signal to an analog signal and outputs the analog signal to a receiver 105 via a first transmission path 104. The ternary digital signal expresses ordinary data DT in a binary form, and expresses that the request signal req is invalid by an intermediate potential between 0 and 1 (differential voltage being 0 in the case of a differential signal). For example, in the ternary digital signal, "−1" indicates "0" of data DT, "+1" indicates "1" of data DT, and "0" indicates an idle state IDL as illustrated in FIG. 2.

The receiver 105 has a four-bit analog-digital converter 1003 and a judgment circuit 1004. The four-bit analog-digital converter 1003 converts an analog signal received from the first transmission path 104 to a four-bit digital signal. The judgment circuit 1004 judges that the signal from the transmitter 103 has got out of the intermediate potential (differential 0 potential) and detects a valid request signal req.

Figure 11A:
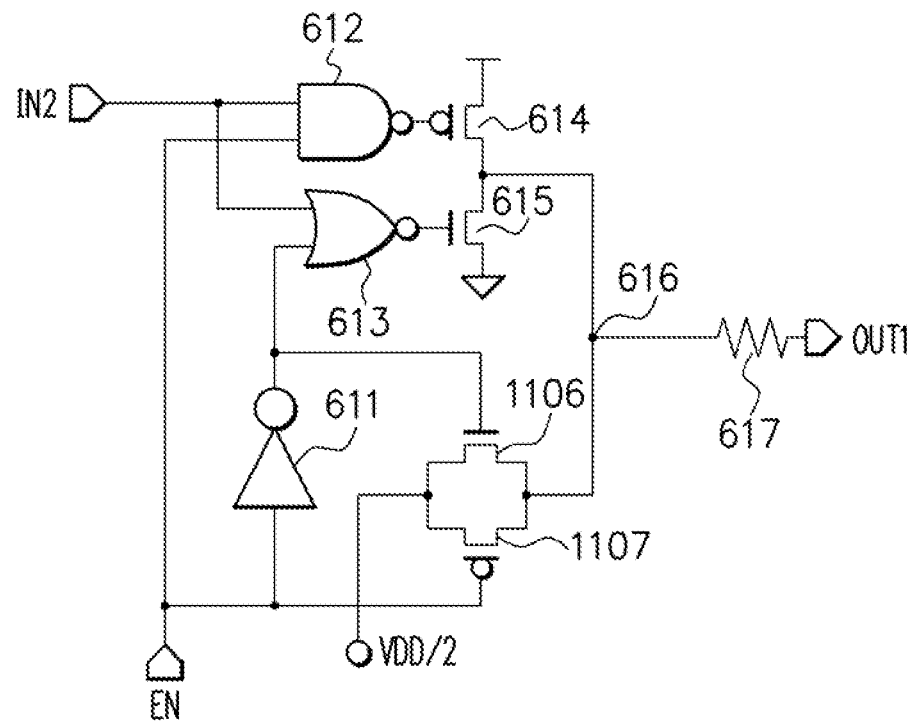
FIG. 11A is a diagram illustrating a structure example of a driver in a transmitter.

FIG. 11A is a diagram illustrating a structure example of a driver 607 (FIG. 6A) in the transmitter 1001. The circuit of FIG. 11A is made by adding transistors 1106 and 1107 to the circuit of FIG. 6B. Differences of the circuit of FIG. 11A from the circuit of FIG. 6B will be described below. An n-channel field effect transistor 1106 has a drain connected to a node of intermediate potential VDD/2, a gate connected to an output terminal of an inverter 611, and a source connected to an output node 616. A p-channel field effect transistor 1107 has a source connected to the node of intermediate potential VDD/2, a gate connected to a node of enable signal EN, and a drain connected to the output node 616. When the enable signal EN becomes low level (invalid), transistors 614 and 615 turn off and the transistors 1106 and 1107 turn on. As a result, an output terminal OUT1 becomes the intermediate potential VDD/2. Further, when the enable signal EN is high level (valid), the output terminal OUT1 is at power supply voltage VDD or ground potential according to data at an input terminal IN2. Thus, the driver 607 can output the ternary digital signal. Further, the driver 607 can generate the intermediate potential VDD/2 at the same time constant as the normal operation.

Figure 11B:
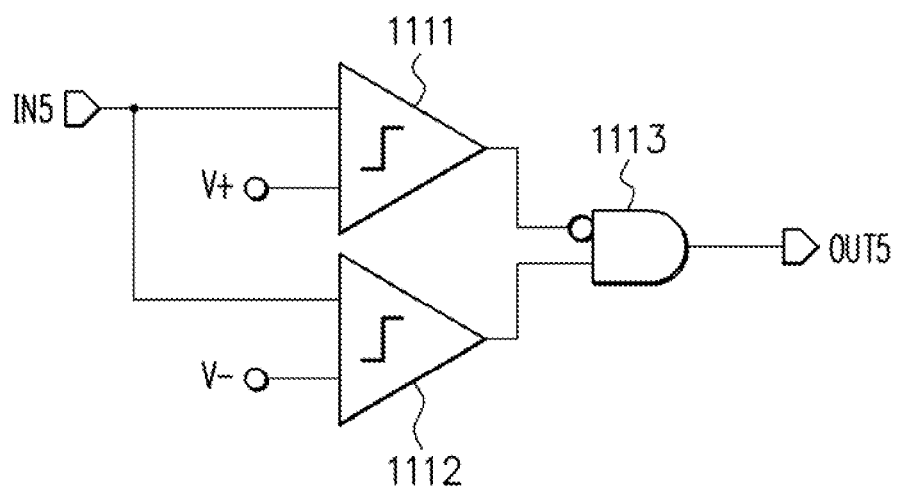
FIG. 11B is a diagram illustrating a structure example of an intermediate potential detecting circuit in a receiver.

FIG. 11B is a diagram illustrating a structure example of an intermediate potential detecting circuit in the receiver 105. The receiver 105 may detect an intermediate potential by the intermediate potential detecting circuit instead of the four-bit analog-digital converter 1003 and the judgment circuit 1004 of FIG. 10. The receiver 105 has window comparators 1111 and 1112, detects the intermediate potential VDD/2 based on a signal at an input terminal IN5, and outputs a detection signal to an output terminal OUT5. The comparator 1111 outputs a high level when the voltage at the input terminal IN5 is higher than a positive voltage V+, or outputs a low level when the voltage at the input terminal IN5 is lower than the positive voltage V+. The comparator 1112 outputs a high level when the voltage at the input terminal IN5 is higher than a negative voltage V−, or outputs a low level when the voltage at the input terminal IN5 is lower than the negative voltage V−. A logical product circuit 1113 outputs a logical product signal of a logical inversion signal of the output signal of the comparator 1111 and the output signal of the comparator 1112 to the output terminal OUT5. When the voltage of the input terminal IN5 is the power supply voltage VDD or ground potential, the output terminal OUT5 becomes low level. When the voltage of the input terminal IN5 is the intermediate potential VDD/2, the output terminal OUT5 becomes high level. When the output terminal OUT5 is high level, an invalid request signal req is detected, or when the output terminal OUT5 is low level, a valid request signal req is detected.

In this embodiment, for transmitting the request signal req and data DT to one first transmission path 104, the transmitter 103 transmits a ternary or higher signal to the first transmission path 104. Accordingly, it is not necessary to use a dedicated transmission path when the transmitter 103 transmits the request signal req, and thus there is a merit that the number of wirings of transmission paths can be reduced. Further, the request signal req and data DT share the same first transmission path 104, and thus there is a merit that it is not necessary to care about the skew between the request signal req and data DT.

—Fourth Embodiment—

Figure 12:
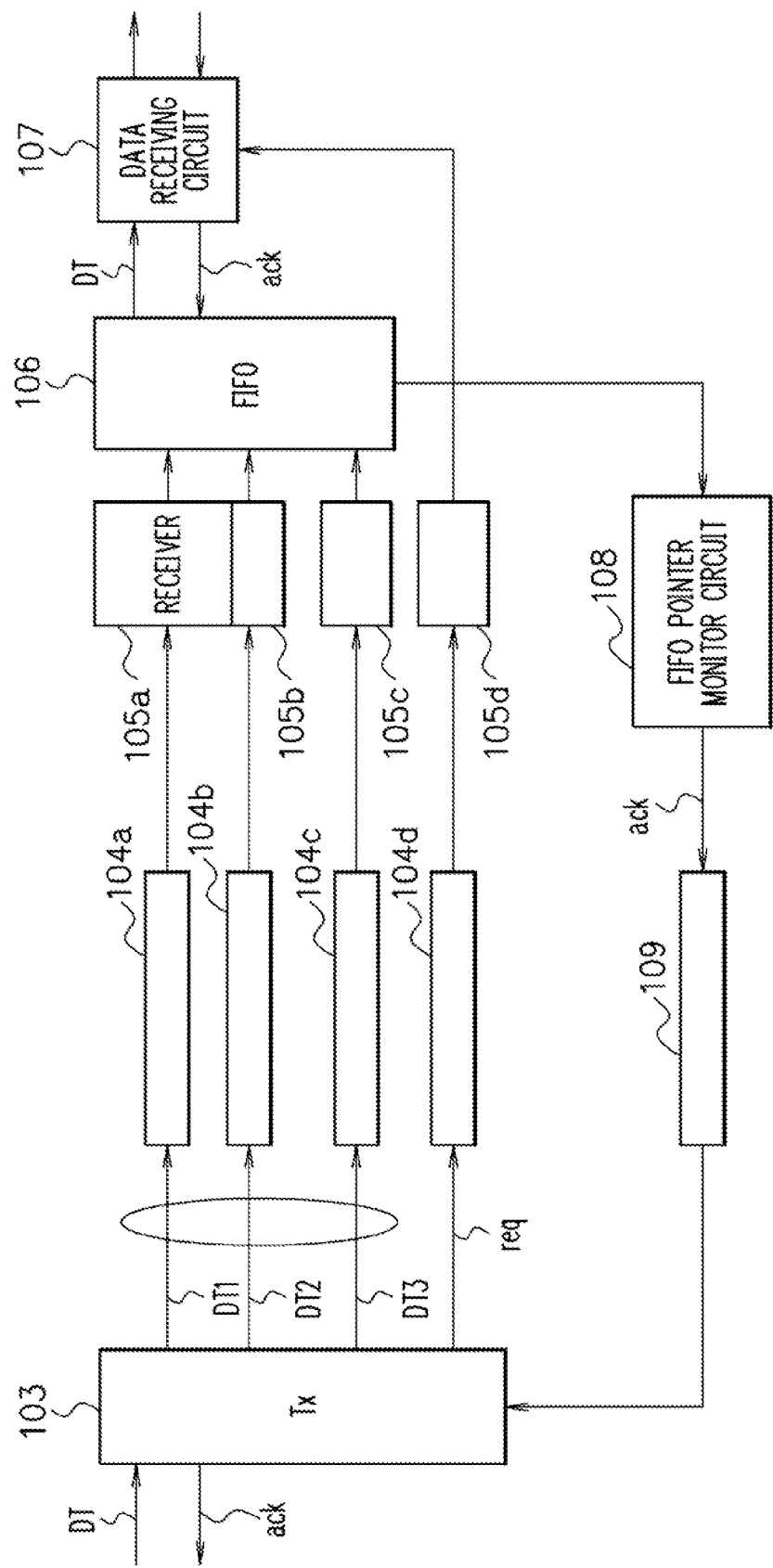
FIG. 12 is a diagram illustrating a structure example of a transmission system according to a fourth embodiment.

FIG. 12 is a diagram illustrating a structure example of a transmission system according to a fourth embodiment. In this embodiment, plural first transmission paths 104a to 104d and plural receivers 105a to 105d are provided. Differences of this embodiment from the first embodiment will be described below. The transmitter 103 transmits plural pieces of data DT1 to DT3 and one request signal req common to the plural pieces of data DT1 to DT3 to the receivers 105a to 105d via the plural first transmission paths 104a to 104d. The data DT1 to DT3 received by the receivers 105a to 105c are written in the FIFO memory 106.

The transmitter 103 transmits one request signal req for the data DT1 to DT3 on plural channels. Since the one request signal req is shared by the data DT1 to DT3 on plural channels, the stopped and operating states of the transmitter 103 corresponding to the data DT1 to DT3 on plural channels are all needed to be common. In this embodiment, one request signal req may be transmitted to the bundle of data DT1 to DT3 on plural channels, and thus there is a merit that the number of signal lines can be reduced.

—Fifth Embodiment—

Figure 13:
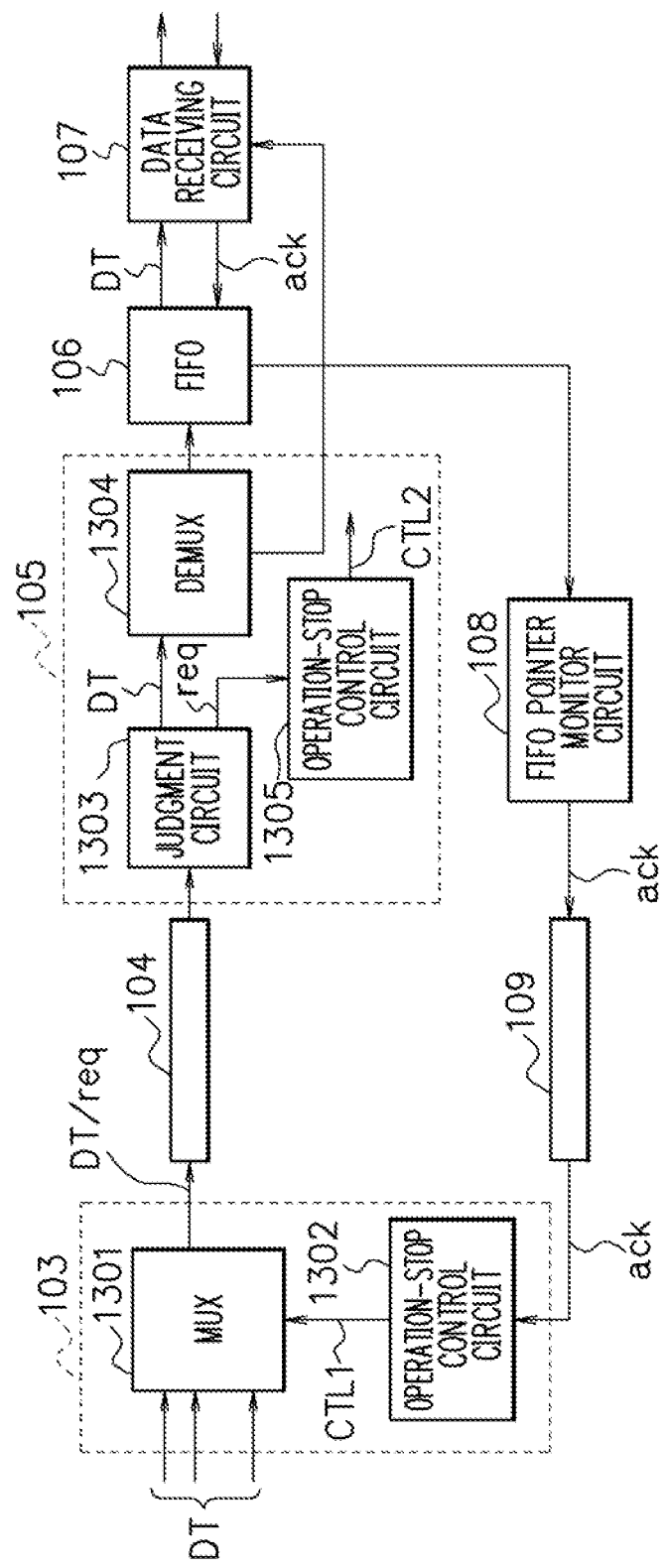
FIG. 13 is a diagram illustrating a structure example of a transmission system according to a fifth embodiment.

FIG. 13 is a diagram illustrating a structure example of a transmission system according to a fifth embodiment. Differences of this embodiment from the first embodiment will be described below. A transmitter 103 has a first multiplexer 1301 and an operation-stop control circuit 1302. The first multiplexer 1301 converts parallel data DT to serial data DT. The transmitter 103 transmits the serial data DT and a request signal req to a receiver 105 via a first transmission path 104. The operation-stop control circuit 1302 outputs a control signal CTL1 to the first multiplexer 1301 in response to an acknowledge signal ack received from an FIFO pointer monitor circuit 108, so as to control operation and stop of the first multiplexer 1301. The first multiplexer 1301 stops conversion and holds data being converted when the acknowledge signal ack becomes invalid, and resumes conversion of the held data when the acknowledge signal ack becomes valid thereafter.

The receiver 105 has a judgment circuit 1303, a first demultiplexer 1304, and an operation-stop control circuit 1305. The judgment circuit 1303 detects a request signal req based on a signal received from the first transmission path 104, outputs data DT to the first demultiplexer 1304 and outputs the request signal req to the operation-stop control circuit 1305. The first demultiplexer 1304 converts serial data DT to parallel data DT. The operation-stop control circuit 1305 outputs a control signal CTL2 to the first demultiplexer 1304 in response to the request signal req, so as to control operation and stop of the first demultiplexer 1304. The first demultiplexer 1304 stops conversion and holds data being converted when the request signal req becomes invalid, and resumes conversion of the held data when the request signal req becomes valid thereafter. The receiver 105 outputs the serial data DT to the FIFO memory 106.

As described above, the transmitter 103 converts plural pieces of parallel data DT and the request signal req to a serial signal by the first multiplexer 1301 and transmits it to the first transmission path 104. According to this embodiment, there occurs a merit that the number of first transmission paths 104 between the transmitter 103 and the receiver 105 can be reduced, and a problem of skew such that the timings of the request signal req and data DT are different in every channel can be prevented.

—Sixth Embodiment—

Figure 14:
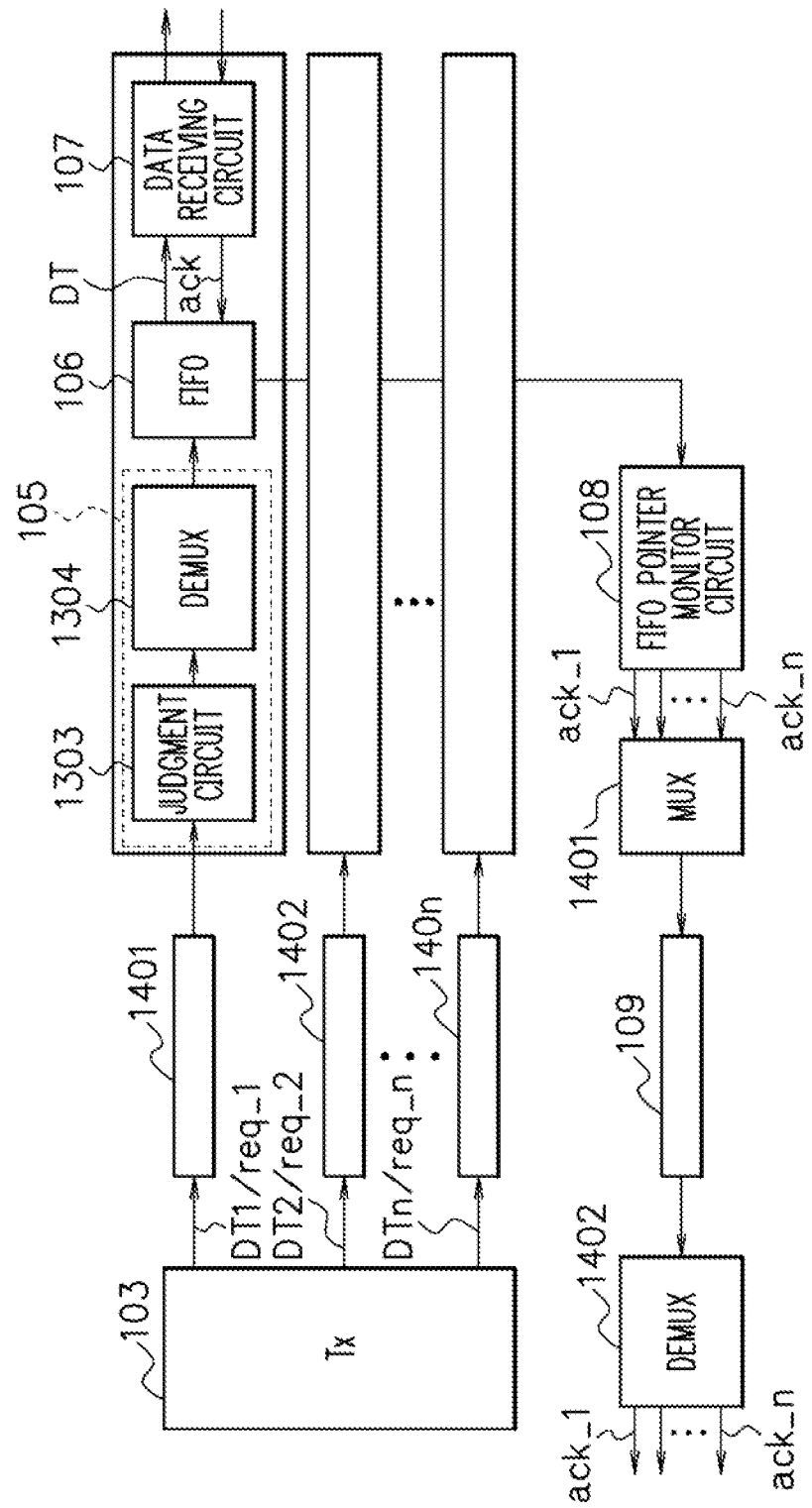
FIG. 14 is a diagram illustrating a structure example of a transmission system according to a sixth embodiment.

FIG. 14 is a diagram illustrating a structure example of a transmission system according to a sixth embodiment. Differences of this embodiment from the first embodiment will be described below. In this embodiment, plural groups (n number) of a first transmission path 1401 to 140n, a receiver 105, an FIFO memory 106, and a data receiving circuit 107 are provided. The transmitter 103 transmits n pieces of data DT1 to DTn and n request signals req_1 to req_n corresponding to the n pieces of data DT1 to DTn to the n receivers 105 via the n first transmission paths 1401 to 140n. The receiver 105 has a judgment circuit 1303 and a first demultiplexer 1304 similarly to FIG. 13. A FIFO pointer monitor circuit 108 generates n acknowledge signals ack_1 to ack_n corresponding to data accumulation amounts in n FIFO memories 106. A second multiplexer 1401 converts the n acknowledge signals ack_1 to ack_n from parallel to serial, and transmits them to a second demultiplexer 1402 via a second transmission path 109. The second demultiplexer 1402 converts the n acknowledge signals ack_1 to ack_n from serial to parallel. The transmitter 103 transmits the n pieces of data DT1 to DTn and the n request signals req_1 to req_n based on the n acknowledge signals ack_1 to ack_n, similarly to the first embodiment.

In this embodiment, when the FIFO pointer monitor circuit 108 transmits acknowledge signals ack to the transmitter 103, the FIFO pointer monitor circuit multiplexes and transmits the acknowledge signals ack_1 to ack_n on plural channels by the second multiplexer 1401. The acknowledge signals ack_1 to ack_n are at a rate sufficiently lower than the data rate, and only needs a bandwidth equivalent to or smaller than that of data channels even when amounts of several tens of signals are multiplexed. Thus, the acknowledge signals can be transmitted sufficiently. In this embodiment, there occurs a merit that the number of signals of the second transmission paths 109 for transmitting the acknowledge signals ack_1 to ack_n can be reduced largely.

—Seventh Embodiment—

FIG. 15 is a diagram illustrating a structure example of part of a transmission system according to a seventh embodiment. Differences of this embodiment from the first embodiment will be described below. A hybrid circuit 1501 is connected to a transmitter 103 and transmits data DT and a request signal req of the transmitter 103 to a first transmission path 104. A hybrid circuit 1502 receives the data DT and the request signal req via the first transmission path 104 and outputs them to a receiver 105. Further, the hybrid circuit 1502 is connected to a FIFO pointer monitor circuit 108 and transmits an acknowledge signal ack of the FIFO pointer monitor circuit 108 to the first transmission path 104. The hybrid circuit 1501 receives the acknowledge signal ack via the first transmission path 104 and outputs the signal to the transmitter 103.

The hybrid circuits 1501 and 1502 are connected to each other via the first transmission path 104. Using the hybrid circuits 1501 and 1502, the FIFO pointer monitor circuit 108 transmits the acknowledge signal ack to the transmitter 103 in a reverse direction relative to the data DT via the first transmission path 104 by simultaneous bi-directional transmission.

In this embodiment, the FIFO pointer monitor circuit 108 uses a simultaneous bi-directional transmission technique to transmit the acknowledge signal ack to the transmitter 103 in a reverse direction relative to the data DT via the first transmission path 104. The hybrid circuits 1501 and 1502 can transmit signals simultaneously bi-directionally to one transmission path 104 by the simultaneous bi-directional transmission technique. The hybrid circuits 1501 and 1502 have a function to separate transmitted data DT and an acknowledge signal ack which is superimposed on the transmitted data DT, and can transmit a signal bi-directionally on one transmission path 104. According to this embodiment, it is possible to transmit the acknowledge signal ack without providing a second transmission path 109 dedicated to the acknowledge signal ack separately from the first transmission path 104, and thus it is possible to reduce the number of signals on a transmission path.

—Eighth Embodiment—

Figure 16:
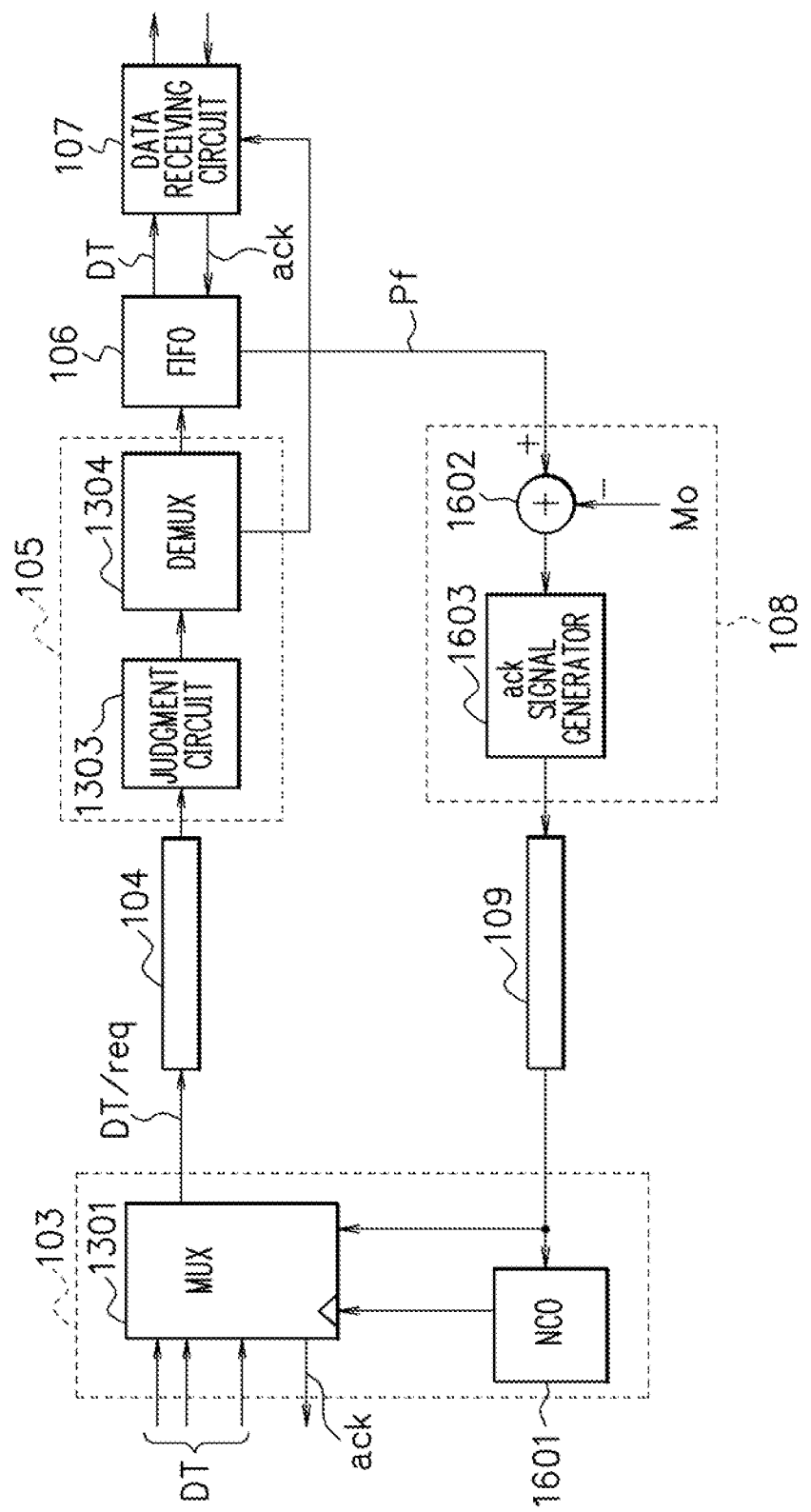
FIG. 16 is a diagram illustrating a structure example of a transmission system according to an eighth embodiment.

FIG. 16 is a diagram illustrating a structure example of a transmission system according to an eighth embodiment. Differences of this embodiment from the first embodiment will be described below. Transmitter 103 has a first multiplexer 1301 and a numerically controlled oscillator (NCO) 1601. A receiver 105 has a judgment circuit 1303 and a first demultiplexer 1304 similarly to FIG. 13. A FIFO pointer monitor circuit 108 has a subtracter 1602 and an acknowledge signal generator 1603. The subtracter 1602 subtracts a threshold Mo from a data accumulation amount Pf in a FIFO memory 106, and outputs the result to the acknowledge signal generator 1603. The acknowledge signal generator 1603 sets the output value of the subtracter 1602 to the value of an acknowledge signal ack, and transmits the acknowledge signal ack to the transmitter 103 via a second transmission path 109. However, the acknowledge signal generator 1603 sets the value of the acknowledge signal ack to "0" when the output value of the subtracter 1602 is 0 or smaller.

In this embodiment, the value obtained by subtracting the threshold Mo from the data accumulation amount Pf in the FIFO memory 106 is used as the acknowledge signal ack transmitted by the FIFO pointer monitor circuit 108. The transmitter 103 adjusts the transmission data rate of the data DT and the request signal req so that the data accumulation amount indicated by the received acknowledge signal ack becomes a set value. Specifically, the numerically controlled oscillator 1601 controls an oscillation frequency based on the acknowledge signal ack, and outputs this oscillation signal to the multiplexer 1301, to thereby adjust the data rate.

As described above, the FIFO pointer monitor circuit 108 transmits an invalid acknowledge signal ack to the transmitter 103 via the second transmission path 109 when the data accumulation amount Pf in the FIFO memory 106 is larger than the threshold Mo. Further, when the data accumulation amount Pf in the FIFO memory 106 is smaller than the threshold Mo, the FIFO pointer monitor circuit 108 transmits a valid acknowledge signal ack having a value corresponding to the data accumulation amount Pf in the FIFO memory 106 to the transmitter 103 via the second transmission path 109. The transmitter 103 changes the transmission bit rate of the data DT according to the value of the valid acknowledge signal ack. Note that the value of the acknowledge signal ack is not necessary to be continuous, and may be set in plural steps (for example, four steps) according to the data accumulation amount Pf. According to this embodiment, since the data rate corresponding to processing performance of the receiver 105 and the data receiving circuit 107 is selected, there is an advantage that the power consumption of the transmitter 103 can be minimized.

—Ninth Embodiment—

FIG. 17A to FIG. 17C are diagrams illustrating a modulation circuit and a demodulation circuit according to a ninth embodiment. Differences of this embodiment from the second embodiment will be described below. The transmission paths 802 and 109 of FIG. 8 can be a transmission path using a capacitive coupling. In this case, the transmission paths 802 and 109 are not able to transmit direct-current components of a request signal req and an acknowledge signal ack, respectively. Accordingly, in this embodiment, the request signal req and the acknowledge signal ack are modulated from a low-frequency signal to a high-frequency signal, and the request signal req and the acknowledge signal ack as a high-frequency signal are transmitted to the transmission paths 802 and 109, respectively. Thus, the transmission paths 802 and 109 can transmit the request signal ack and the acknowledge signal ack.

FIG. 17A illustrates a modulation circuit modulating the request signal req and the acknowledge signal ack from a low-frequency signal to a high-frequency signal. The modulation circuit modulates a low frequency request signal req or acknowledge signal ack to a high-frequency request signal reqt or acknowledge signal ackt. An exclusive logical sum circuit 1701 outputs an exclusive logical sum signal of the low-frequency request signal req (or acknowledge signal ack) illustrated in FIG. 17C and an output signal reqt (or ackt) of a flip flop 1702. The flip flop 1702 latches an output signal of the exclusive logical sum circuit 1701 and outputs the high-frequency request signal reqt (or acknowledge signal ackt) illustrated in FIG. 17C in synchronization with a clock signal.

FIG. 17B illustrates a demodulation circuit demodulating the request signal req and the acknowledge signal ack from a high-frequency signal to a low-frequency signal. The demodulation circuit demodulates the high-frequency request signal reqt or acknowledge signal ackt to the low-frequency request signal req or acknowledge signal ack. A flip flop 1711 latches and outputs the high-frequency request signal reqt (or acknowledge signal ackt) illustrated in FIG. 17C in synchronization with the clock signal. An exclusive logical sum circuit 1712 outputs an exclusive logical sum signal of the high-frequency request signal reqt (or acknowledge signal ackt) and an output signal of the flip flop 1711 as the low-frequency request signal req (or acknowledge signal ack).

A transmitter 103 has a first modulation circuit (FIG. 17A) modulating the low-frequency request signal req to the high-frequency request signal reqt, and transmits the high-frequency request signal reqt to a receiver 105 via the first transmission path 802. The receiver 105 has a first demodulation circuit (FIG. 17B) demodulating the received high-frequency request signal reqt to the low-frequency request signal req.

A FIFO pointer monitor circuit 108 has a second modulation circuit (FIG. 17A) modulating the low-frequency acknowledge signal ack to the high-frequency acknowledge signal ackt, and transmits the high-frequency acknowledge signal ackt to the transmitter 103 via the second transmission path 109. The transmitter 103 has a second demodulation circuit (FIG. 17B) demodulating the received high-frequency acknowledge signal ackt to the low-frequency acknowledge signal ack.

The high-frequency request signal reqt or acknowledge signal ackt is fixed to low-level when the low-frequency request signal req or acknowledge signal ack is low level, or repetitive pulses occur when the low-frequency request signal req or acknowledge signal ack is high level. The high-frequency request signal reqt and acknowledge signal ackt transmitted to the transmission paths 802 and 109 have no direct-current component, and thus there is an advantage that the signals can be transmitted via the transmission paths 802 and 109 which use capacitive coupling.

As described above, according to the first to ninth embodiments, operation of the transmitter 103 and the receiver 105 is stopped according to the data accumulation amount in the FIFO memory 106, and in an operation stopped state, the transmitter 103 and the receiver 105 can be turned to the low power consumption mode. Further, by using the request signal req and the acknowledge signal ack, the data rate can be improved, and power consumption of the transmitter 103 and the receiver 105 can be reduced.

It should be noted that the present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A transmission system, comprising:
  a first transmission path;
  a transmitter transmitting data and a request signal to the first transmission path;

a receiver receiving the data and the request signal from the transmitter via the first transmission path;
a FIFO memory to which the data received by the receiver are written after the receiver received the data;
a data receiving circuit reading data in the FIFO memory and performing reception processing; and
a monitor circuit transmitting a valid acknowledge signal to the transmitter when a data accumulation amount in the FIFO memory is smaller than a threshold, or transmitting an invalid acknowledge signal to the transmitter when the data accumulation amount in the FIFO memory is larger than the threshold, wherein
the transmitter transmits the request signal which is valid and the data when the acknowledge signal is valid, or stops transmission processing of the data and transmits the request signal which is invalid when the acknowledge signal is invalid, and
the receiver performs reception processing of the data when the request signal is valid or stops reception processing of the data when the request signal is invalid, wherein
the transmitter stops operation of a data transmission processing unit by stopping a clock signal when the acknowledge signal is invalid, and
the receiver stops operation of a data reception processing unit by stopping the clock signal when the request signal is invalid.

2. The transmission system according to claim 1, wherein the transmitter transmits a ternary or higher signal to the first transmission path so as to transmit the request signal and the data to the one first transmission path.

3. The transmission system according to claim 1, wherein the first transmission path is provided in plurality, and
the transmitter transmits plural pieces of data and one request signal common to the plural pieces of data to the receiver via the plural first transmission paths.

4. A transmission system, comprising:
a first transmission path;
a transmitter transmitting data and a request signal to the first transmission path;
a receiver receiving the data and the request signal from the transmitter via the first transmission path;
a FIFO memory to which the data received by the receiver are written after the receiver received the data;
a data receiving circuit reading data in the FIFO memory and performing reception processing; and
a monitor circuit transmitting a valid acknowledge signal to the transmitter when a data accumulation amount in the FIFO memory is smaller than a threshold, or transmitting an invalid acknowledge signal to the transmitter when the data accumulation amount in the FIFO memory is larger than the threshold, wherein
the transmitter transmits the request signal which is valid and the data when the acknowledge signal is valid, or stops transmission processing of the data and transmits the request signal which is invalid when the acknowledge signal is invalid, and
the receiver performs reception processing of the data when the request signal is valid or stops reception processing of the data when the request signal is invalid, wherein
the transmitter has a first multiplexer converting parallel data to serial data,
the first multiplexer stops conversion and holds data being converted when the acknowledge signal becomes invalid, and resumes conversion of the held data when the acknowledge signal becomes valid thereafter,
the receiver has a first demultiplexer converting serial data to parallel data, and
the first demultiplexer stops conversion and holds data being converted when the request signal becomes invalid, and resumes conversion of the held data when the request signal becomes valid thereafter.

5. The transmission system according to claim 1, wherein
the first transmission path, the receiver, the FIFO memory, and the data receiving circuit are provided in plural groups,
the transmitter transmits plural pieces of data and plural request signals corresponding to the plural pieces of data to the plural receivers via the plural first transmission paths,
the monitor circuit generates plural acknowledge signals corresponding to data accumulation amounts in the plural FIFO memories,
the transmission system further comprises a second multiplexer converting the plural acknowledge signals from parallel to serial and transmitting the converted signals to the transmitter, and
the transmitter transmits the plural pieces of data and the plural request signals based on the acknowledge signals transmitted by the second multiplexer.

6. The transmission system according to claim 1, wherein
the monitor circuit transmits the acknowledge signal to the transmitter in a reverse direction relative to the data via the first transmission path by simultaneous bidirectional transmission.

7. The transmission system according to claim 1, wherein
the monitor circuit transmits to the transmitter a valid acknowledge signal having a value corresponding to the data accumulation amount in the FIFO memory when the data accumulation amount in the FIFO memory is smaller than the threshold, and
the transmitter changes a transmission bit rate for the data according to the value of the valid acknowledge signal.

8. A transmission system, comprising:
a first transmission bath;
a transmitter transmitting data and a request signal to the first transmission path;
a receiver receiving the data and the request signal from the transmitter via the first transmission path;
a FIFO memory to which the data received by the receiver are written after the receiver received the data;
a data receiving circuit reading data in the FIFO memory and performing reception processing; and
a monitor circuit transmitting a valid acknowledge signal to the transmitter when a data accumulation amount in the FIFO memory is smaller than a threshold, or transmitting an invalid acknowledge signal to the transmitter when the data accumulation amount in the FIFO memory is larger than the threshold, wherein
the transmitter transmits the request signal which is valid and the data when the acknowledge signal is valid, or stops transmission processing of the data and transmits the request signal which is invalid when the acknowledge signal is invalid, and
the receiver performs reception processing of the data when the request signal is valid or stops reception processing of the data when the request signal is invalid , wherein
the transmitter has a first modulation circuit modulating the request signal from a low frequency to a high frequency and transmits the high-frequency request signal to the receiver via the first transmission path, the receiver has a first demodulation circuit demodulating the received request signal from a high frequency to a low frequency, the monitor circuit has a second modulation circuit modulating the acknowledge signal from a low frequency to a high frequency and transmits the high-frequency acknowledge signal to the transmitter, and the transmitter has a second demodulation circuit demodulating the received acknowledge signal from a high frequency to a low frequency.

* * * * *